May 23, 1933. A. C. HIGGINS 1,910,920
METHOD OF SEPARATING FROM MIXTURES MATERIALS OF DIFFERENT MELTING POINTS
Filed Sept. 22, 1931

Inventor
A. C. Higgins
By Clarence A. O'Brien
Attorney

Patented May 23, 1933

1,910,920

UNITED STATES PATENT OFFICE

ARCHIE C. HIGGINS, OF HOPKINSVILLE, KENTUCKY

METHOD OF SEPARATING FROM MIXTURES MATERIALS OF DIFFERENT MELTING POINTS

Application filed September 22, 1931. Serial No. 564,402.

This invention relates to a method or process for separating from mixtures elements or materials having different melting points, such as obtains, for example, in mixtures of hydrocarbons and the like.

It is the present practice to separate the constituents of hydrocarbon mixtures such as paraffin wax by two general processes. In one process, diluents or solvents for the low melting fractions are added to the mixture and then the mixture is chilled and filtered so as to separate the low melting fractions therefrom.

The other method is the separation of the low melting fractions by maintaining the mixture for a long period of time at a temperature above the melting points of the low melting fractions, and permitting the low melting fractions to drain away.

The latter method is commonly known as "sweating." The disadvantage of the sweating methods used is that some of the high melting fractions are lost along with the low melting fractions, by solution in the low melting fractions.

It is the purpose of the present invention to provide a method which is superior to the above-mentioned methods in that it gives a sharper and more economical separation of the low melting fractions than has heretofore been possible.

This and other economies and advantages will be recognized as proceeding from the process or method of the invention as the explanation and description thereof proceeds below.

These and other objects of the invention, its nature, and its composition and arrangement and combination of parts and the sequence and duration of steps and operations involved will be readily understood from a reading of the following description in connection with the drawing in which:—

In carrying out the process of the invention, the mixture of hydrocarbons or the like, is sweated at gradually increasing temperatures and the fusion products or sweatings are gradually chilled and fractionally crystallized at decreasing temperatures, the sweating and crystallization taking place counter-current and in contact.

Figure 1:
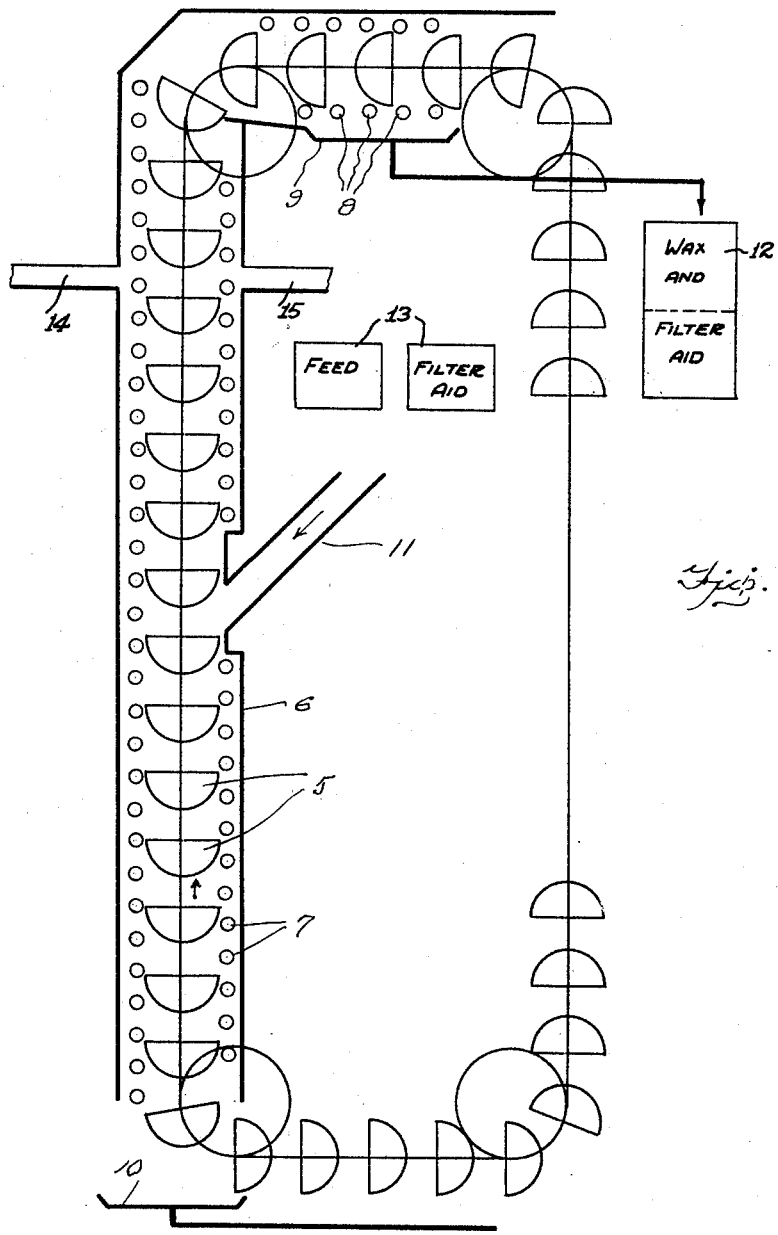
Figure 1 is a diagrammatic view of a bucket elevator system employed in carrying out the purpose of the invention.
Figure 2:
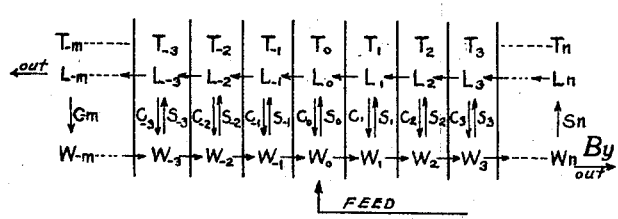
Fig. 2 is a graphic representation of the progress of the process as carried on in the apparatus illustrated in Fig. 1.

Fig. 2 illustrates the phenomena involved in which $T{-}1$, $T_0$, $T_1$, $T_2$ and so on, represent temperature zones in the apparatus in Fig. 1, $T_2$ being hotter than $T{-}1$ and $T_1$, and $T_1$ is hotter than $T_0$. $W{-}1$, $W_0$ and $W_1$ and so on, represent the wax or solid phase such as met with in hydrocarbon mixture, and $L{-}1$, $L_0$, $L_1$, and so on represent increasing temperatures in the liquid phase.

In Fig. 2, the feed is illustrated as entering the system at the zone marked $T_0$. As the buckets of the conveyor system move upwardly into hotter zones, say from $T_0$ to $T_1$, some of the low melting constituents are sweated out in the form of a liquid $S_1$. During the phenomenon the liquid L, from zone $T_1$ at a higher temperature than $T_1$, undergoes fractional crystallization as it drops through the zone $T_1$, forming the solid $C_1$. The liquid $S_1$ and the uncrystallized part of $L_1$ mix and pass into zone $T_0$ becoming liquid $L_0$.

The crystals $C_1$ together with the other wax $W_1$, move into higher temperature zone $T_2$ becoming wax $W_2$. In the zones $T_0$ and $T_2$ the process is repeated, and it continues in this manner throughout the system. In the hottest temperature zone $T_n$ the wax receives the final sweating and is from that point removed. The resultant liquid $L_n$ in this zone is the same as the sweatings $S_n$, there being no fractional crystallization. Conversely, in the coldest zone $T{-}_m$, the liquid $L{-}m$ is removed and the wax $W{-}m$ is the same as the final crystallization product from $L{-}m$ or $C{-}m$. This is the preferred condition in the coldest zone, although I have successfully operated the process with the feed entering the coldest zone.

The method outlined is analogous to distillation with a fractioning column except that the process of the invention deals with the solid and liquid phase while the distillation column deals only with the liquid and vapor phases. Another important difference is that in a fractioning column, both phases are fluid and can be made to flow through by forces exerted from the outside. The gas expands upwardly through the tower or column from the pressure developed in the still or reboiler, while the liquid flows down under the influence of gravity. However, in the process of the invention, one of the phases is in a solid state, and consequently, the solid material must be conveyed mechanically from one temperature zone to the next throughout the system. This arrangement is believed to be entirely new in view of the prior art.

The materials which are separated by the process of the invention may be washed during the process with a liquid, such as water, to improve the heat transfer and to aid the separation through accelerating the removal of the sweatings to the next colder zone. Substances like naphtha, benzol, or ethyl acetate may be used to dissolve or dilute the low melting fractions, and diatomaceous earth, sawdust or the like may be added during the process as a filter aid. These substances may be introduced into the tower above, below or with the feed.

Although the purification or fractioning of paraffin wax has been used herein as an example of the process, it is obvious that the process is equally applicable to other mixtures, such as naphthalene, sludge, mixtures of organic compounds produced synthetically, or natural mixtures such as carnauba wax or beeswax, and also lard, and tallow, vegetable oils, organic acids, and the higher alcohols.

Mixtures of inorganic substances such as alloys may be separated according to the principles of the invention, although alloys, generally speaking, can be separated only into pure metal and eutectic.

By referring to Fig. 1, an idea of the general character of a suitable apparatus for carrying out the invention may be gained. The main idea is to provide separate containers so that there is maintained a number of batches of the material being treated separated at different elevations. The containers 5 move upwardly into regions of higher temperature where the solids in the containers are sweated at successively higher temperatures. The sweatings drip through porous bottoms constructed in the containers 5 into the next below container, where some of the sweatings crystallizes. The remainder of the sweatings, together with the sweatings from this next below container, drip into the next lower container which is at a lower temperature, and so on.

The conveyor system illustrated, may be of the bucket type having buckets 5 with bottoms of wire mesh, or other suitable perforations or filtering media, and arranged one above the other so that the sweatings from each bucket will drip into the next below bucket. The tower in which the buckets move is indicated by the numeral 6 in Fig. 1.

In this tower, the temperature is regulated by steam and refrigeration pipes 7 or any other suitable means, to provide that the upper part of the tower be at a temperature somewhat above the desired melting point of the high melting fractions, and the lower part of the tower at a temperature somewhat below the desired melting or clouding point of the low melting fractions.

If the tower is carefully insulated, the temperature regulating devices 7 will be necessary only at the top and at the bottom, since the descending sweatings and the ascending solids, and the material of the buckets and of the conveyor itself will serve to make a smooth temperature gradation from the top of the tower to the bottom thereof. It is arranged that at the top of the tower the buckets will be tipped so as to dump the high melting fractions from the buckets 5. The buckets are turned upon their sides, and are passed over steam pipes or other suitable heating media 8 so that by their high temperature, the solid fractions will be melted out into the drip catcher 9 for removal from the tower.

The feed indicated at 11 is in the form of a chute to enable the introduction into the buckets by any suitable means of the mixture described. It has been found experimentally that the best results are obtained when the feed material is at the temperature at which it just begins to sweat and is introduced at that part of the tower which is approximately at the same temperature.

For simultaneous introduction into the tower with the material being treated, filter aid water and solvents may be used. These products are supplied in suitable condition and manner from a conventional feed tank such as is diagrammatically illustrated at 13 in the drawing. If desired, conduits such as indicated at 14 and 15 may enter the tower for discharging therein solvents and water and other assisting elements from any suitable source.

The foregoing describes the fundamental principles of the method or process of the invention and an apparatus suitable for carrying it out. Known modifications of the solvent process and of the sweating process may be used in conjunction with it.

For example, naphtha, benzol, or ethyl acetate may be introduced into the buckets through the conduits 14 and 15. Such liquids so introduced have the effect of lowering the melting point of the low melting constituents of the material being treated or the liquid phase. This lowering of the melting point of the low melting constituents produces a greater divergence of melting points between the melting products of the liquid and solid phases with consequent enhancement of the ease and rapidity with which these phases are separated in the process. This aspect of the present invention differs from the use of solvents and other assisting substances in ordinary leaching processes in the provision of the temperature gradient maintained and in the much smaller quantity of solvent used in the process of the invention.

The mixture of oils and solvents caught in the collector 10 at the lower end of the tower may be separated later by conventional processes of distillation as indicated diagrammatically at 16. The mixture of oil and water caught in the collector 10 may be separated by a conventional decantation process as indicated diagrammatically at 17.

Warm water may be introduced into the tower by means of the conduits 14 and 15 to aid the heat transfer since the contact of water and wax is more intimate than that of air and wax, whereby to improve the separation of the constituents of the material being treated.

Filter aid, such as diatomaceous earth may be introduced into the tank mixer 13 before the material is fed to the tower whereby to improve the separation of the constituents by providing a nucleus on which the high melting constituents may crystallize and form a more open and filterable structure in the wax mixture in the buckets in the tower. The mixture of filter aid and wax collected at the point 9 may be separated in suitable manner.

It is believed that the above is sufficient description to enable any one acquainted with the art to which the invention relates to understand and carry out the process explained herein and to construct and use an apparatus which will operate according to the principles explained herein, and in consequence, further description is believed to be unnecessary.

It is to be definitely understood that I do not desire to limit the application of this invention to the particular modification set out herein to illustrate the principles thereof, and any change or changes may be made in the materials and in construction and arrangement of parts, and in the duration and sequence of steps and operations involved in the process, within the spirit and scope of the invention.

Having thus described my invention, what I claim as new is:—

1. The process of treating a solid mixture at least one of whose constituents is a crystalline solid, to free said crystalline solid from materials of lower melting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finally withdrawing the desired crystalline material from the top of said zone and withdrawing the remainder of the material fed to said zone from the bottom thereof.

2. The process of treating a solid mixture at least one of whose constituents is a crystalline solid, to free said crystalline solid from materials of lower melting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finally withdrawing the desired crystalline material from the top of said zone and withdrawing the remainder of the material fed to said zone from the bottom thereof, and washing the materials with liquid to promote heat exchange and separation of the materials.

3. The process of treating a solid mixture at least one of whose constituents is a crystalline solid, to free said crystalline solid from materials of lower melting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finally withdrawing the desired crystalline material from the top of said zone and withdrawing the remainder of the material fed to said zone from the bottom thereof, and introducing solvents and diluents to promote separation.

4. The process of treating a solid mixture at least one of whose constituents is a crystalline solid, to free said crystalline solid from materials of lower meting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finaly withdrawing the desired crystalline material from the top of said zone and withdrawing the remainder of the material fed to said zone from the bottom thereof, and introducing a filter aid.

5. The process of treating a solid mixture at least one of whose constituents is a crystalline solid, to free said crystalline solid from materials of lower melting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finally withdrawing the desired crystalline material from the top of said zone and withdrawing the remainder of the material fed to said zone from the bottom thereof, and introducing simultaneously with the introduction of the solid mixture, solvents and diluents for promoting the separation of materials of lower mounting points from said crystalline solid.

6. The process of treating a solid mixture at least one of whose constituents is a crystalline solid, to free said crystalline solid from materials of lower melting points which comprises, establishing a zone of relatively small cross-section compared with its vertical height, maintaining such a temperature at the top of said zone that all of the constituents of said mixture except said crystalline solid will melt, maintaining in the remainder of said zone an even temperature gradient increasing upwardly, supplying material to be treated to a central portion of said zone, mechanically conveying said material upwardly in said zone by means of a bucket conveyor, the buckets having reticulated bottoms whereby as the material is progressively conveyed, material of successively higher melting points, is melted and falls into the bucket immediately below and finally withdrawing the desired crystalline material from the top of said zone and withdrawing the remainder of the material fed to said zone from the bottom thereof, and introducing simultaneously with the introduction of the solid mixture, solvents and diluents for promoting the separation of materials of lower mounting points from said crystalline solid, and adding a filter aid simultaneously with the introduction of the crystalline solid into said central portion of said zone.

In testimony whereof I affix my signature.

ARCHIE C. HIGGINS.